UNITED STATES PATENT OFFICE.

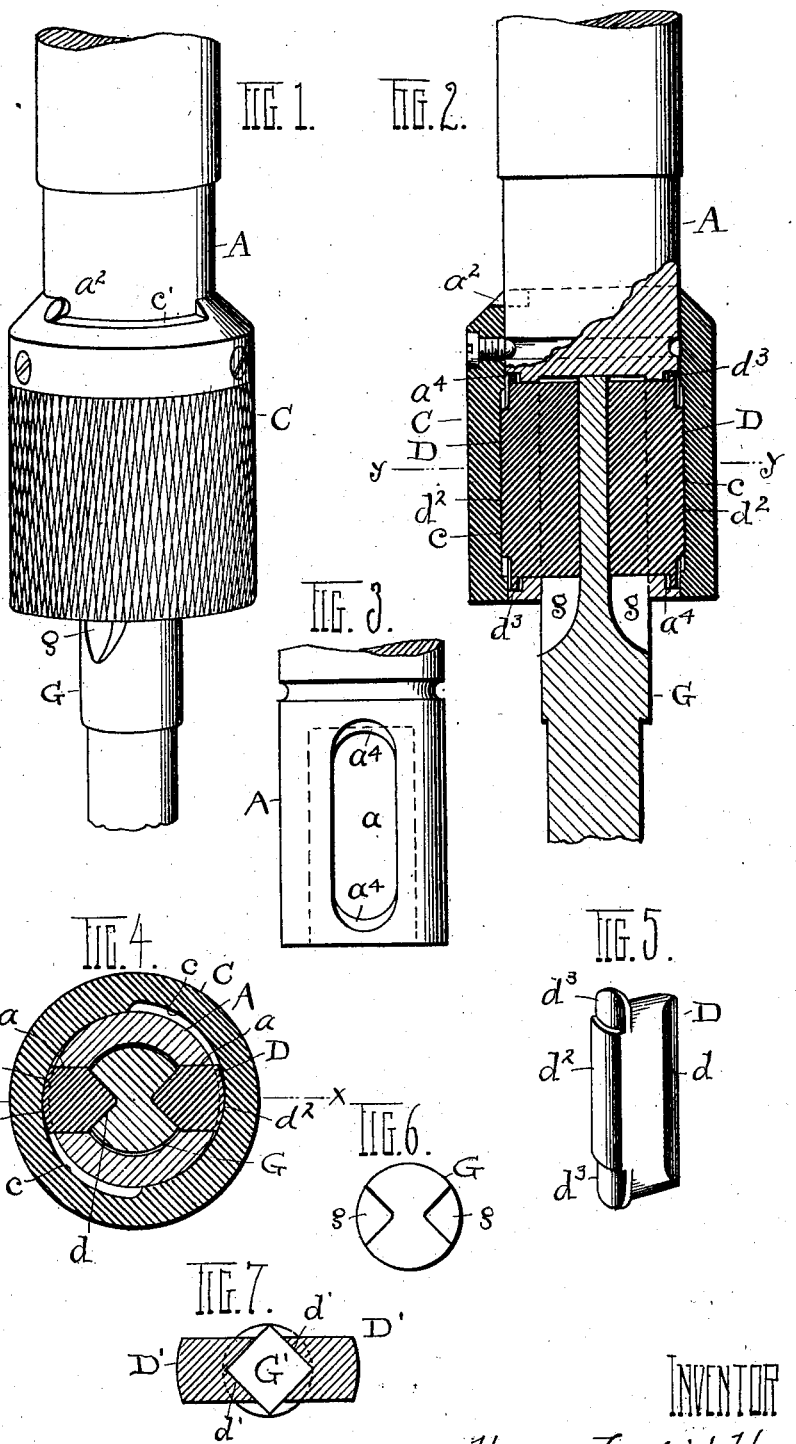

HENRY FREDRICK HAGEDORN, OF CLEVELAND, OHIO, ASSIGNOR TO CLEVELAND TWIST DRILL COMPANY, OF CLEVELAND, OHIO.

CHUCK FOR DRILLS OR OTHER TOOLS.

SPECIFICATION forming part of Letters Patent No. 720,688, dated February 17, 1903.

Application filed August 4, 1902. Serial No. 118,201. (No model.)

*To all whom it may concern:*

Be it known that I, HENRY FREDRICK HAGEDORN, a citizen of the United States, residing at Cleveland, in the county of Cuyahoga and State of Ohio, have invented certain new and useful Improvements in Chucks for Drills or other Tools; and I do declare that the following is a full, clear, and exact description of the invention, which will enable others skilled in the art to which it appertains to make and use the same.

My invention relates to improvements in chucks for drills or other tools; and the object of the invention is to provide means for holding tools which have shanks with a plurality of engaging slots or equivalent engaging surfaces and constructed otherwise substantially as shown and described, and particularly pointed out in the claims.

In the accompanying drawings, Figure 1 is a plain elevation of a chuck embodying my invention and showing the shank of a tool engaged therein; and Fig. 2 is a vertical sectional elevation of Fig. 1 and on a line corresponding to $x\, x$, Fig. 4. Fig. 3 shows an elevation of the lower or socket portion of the chuck alone, disclosing the opposite slots therein. Fig. 4 is a cross-section of all the parts on line $y\, y$, Fig. 2. Fig. 5 is a perspective view of one of the two similar locking-jaws for the tool. Fig. 6 is an end view of the shank of the tool shown in the foregoing views, and Fig. 7 shows a modification of the jaws and tool-shank.

The invention as thus disclosed is adapted more especially for socketing and holding tools which have shanks with engaging surfaces and which are adapted to be engaged by means of jaws, which both serve to center and drive the tool.

In all forms of the invention I construct the chuck A with opposite slots $a$ when only two slots are used, and these slots have parallel sides and preferably circular ends and in this instance extend nearly the entire depth of the socket portion of the chuck, so as to afford the requisite length of engagement for the tool. Upon the chuck thus formed I place a collar or sleeve C, which is rotatably engaged on the chuck subject to stop $a^2$ thereon, adapted to engage the shoulders or ends of recess $c'$ in the top edge of the sleeve, thus limiting rotation of the sleeve to its use for locking and unlocking the tool. The said sleeve is further provided with opposite internal cam-surfaces $c$, which in a sense are depressions or excavations in the interior of the sleeve eccentric to the axis thereof, but leaving a portion of the sleeve at each end uncut, so that the sleeve itself will be held centrally upon the chuck at both ends and its axial relation thereto not be disturbed by reason of said cam-surfaces. These surfaces or cams preferably are constructed, as shown, deepest at their starting-point and with a long gradual taper, which runs out laterally into the plain intervening surface of the sleeve.

D represents the jaws for centering and locking the tool G in the chuck, and the engaging portion of said jaws is designed to be shaped to conform to the shape of the shank of the tool, whatever that may be. At this time many tools, such as twist-drills and the like, have straight cylindrical shanks instead of tapered shanks, which is an old and common style, and some of these shanks have straight grooves or channels of substantially V shape in cross-section and of uniform depth from end to end in their engaging portions, as in Figs. 1 to 6, inclusive. This construction of shank and groove has been found admirably proportioned to engage and drive the tool without undue sacrifice of strength; but the shape of the shank may be varied and not deviate from my invention. Thus Fig. 7, which is directly the reverse of the other form, has jaws D', with V-shaped channels $d'$, instead of V-shaped projections or edges $d$. This adapts them to a square shank G'. Still other forms may be used, while the back $d^2$ of all the jaws is rounded to conform substantially to the perimeter of the chuck and is provided with lips $d^3$ at its ends, which rest in recesses $a^4$ in the chuck at the ends of the slots $a$ and prevent the jaws from dropping inward when the tool is withdrawn.

The cam-surfaces $c$ of the sleeve are of the same length as the backs $d^2$ of the jaws upon which they bear, so that as the sleeve is rotated it crowds the jaws D inward upon the shank of the tool and grips it in the chuck for work. Then as the sleeve is reversely rotated it brings the deeper portions of the cams over the said jaws again, relieves the pressure, and releases the tool. A comparatively slight in-and-out movement of the two opposite jaws will release or engage the tool, so that the eccentric $c$ can be comparatively shallow even at the deepest places. This also enables me to accommodate the chuck to shanks which vary considerably in size, which is important because of the differences found in the standard sizes of different manufacturers. It also enables me to grip the small shanks of small tools and which come only within the inner gripping portions of the jaw, but which are as firmly held as if the shank practically filled the socket, as in Fig. 4.

What I claim is—

1. The chuck having slots in its sides, in combination with jaws in said slots provided with projecting portions to engage about said slots to limit the inward movement of the jaws and a cam-sleeve bearing on said jaws their full length, substantially as described.

2. A tool-chuck having a plurality of slots lengthwise with parallel sides and open to the center of the chuck, in combination with jaws in said slots adapted to center and drive the tool and a sleeve provided with cam-surfaces engaging over said jaws their full length, and the said jaws constructed at their ends to limit their inward movement, substantially as described.

Witness my hand to the foregoing specification this 14th day of July, 1902.

HENRY FREDRICK HAGEDORN.

Witnesses:
R. B. MOSER,
H. T. FISHER.